(12) United States Patent
Meyer

(10) Patent No.: US 7,882,760 B2
(45) Date of Patent: Feb. 8, 2011

(54) SHIFTING DEVICE FOR AN AUTOMATIC TRANSMISSION OF A MOTOR VEHICLE

(75) Inventor: Joerg Meyer, Wagenfeld (DE)

(73) Assignee: ZF Friedrichshafen AG, Friedrichshafen (DE)

(*) Notice: Subject to any disclaimer, the term of this patent is extended or adjusted under 35 U.S.C. 154(b) by 880 days.

(21) Appl. No.: 11/813,701

(22) PCT Filed: Jan. 11, 2006

(86) PCT No.: PCT/DE2006/000031

§ 371 (c)(1),
(2), (4) Date: Jul. 11, 2007

(87) PCT Pub. No.: WO2006/074646

PCT Pub. Date: Jul. 20, 2006

(65) Prior Publication Data

US 2008/0098845 A1 May 1, 2008

(30) Foreign Application Priority Data

Jan. 13, 2005 (DE) .................. 10 2005 001 818

(51) Int. Cl.
*F16H 59/02* (2006.01)
(52) U.S. Cl. .................. 74/473.18; 74/473.33
(58) Field of Classification Search .............. 74/473.18, 74/473.33
See application file for complete search history.

(56) References Cited

U.S. PATENT DOCUMENTS 5,819,591 A * 10/1998 Meyer .................. 74/473.18
5,884,529 A    3/1999 Meyer

FOREIGN PATENT DOCUMENTS

DE    196 00 526 A1    6/1996
DE    101 09 960 A1    9/2002

* cited by examiner

*Primary Examiner*—William C Joyce
(74) *Attorney, Agent, or Firm*—McGlew and Tuttle, P.C.

(57) ABSTRACT

A shifting device is provided for an automatic transmission of a motor vehicle with a first automatic shift gate and with a second tipping gate for a manual, stepwise shifting operation about a middle position. A selector lever can be pivoted about a first shift gate axis into the automatic shift gate and the tipping gate and about a second selector lever axis within the shift gates. The selector lever axis and the shift gate axis are arranged at right angles to one another in a shifting device housing. A connection member is provided for transmitting the pivoting motion of the selector lever in the automatic shift gate to a coupling element to the automatic transmission. The connection member is fixed in a recess of the shifting device housing when the selector lever is pivoted about the shift gate axis into the tipping gate, in which the connection member (6) is fixed rotatably in an axis of rotation (9) at a pivot lever (10), which is rotatably mounted on a holding pin (11), which is arranged in parallel to the selector lever axis (3) at the selector lever housing (2). The pivot lever (10) is mounted with a pin (12) in a holding device (13) of the shifting device housing (5) when the selector lever (1) is in the automatic shift gate (A).

20 Claims, 9 Drawing Sheets

SHIFTING DEVICE FOR AN AUTOMATIC TRANSMISSION OF A MOTOR VEHICLE

CROSS REFERENCE TO RELATED APPLICATIONS

This application is a United States National Phase application of International Application PCT/DE2006/000031 and claims the benefit of priority under 35 U.S.C. §119 of German Patent Application DE 10 2005 001 818.1 filed Jan. 13, 2005, the entire contents of which are incorporated herein by reference.

FIELD OF THE INVENTION

The present invention pertains to a shifting device for an automatic transmission of a motor vehicle with an automatic shift gate and with a tipping gate for a manual, stepwise shifting operation about a middle position, with a selector lever which is pivotable about a first shift gate axis into the automatic shift gate and into the tipping gate and about a second selector lever axis within the shift gates, wherein the selector lever axis and the shift gate axis are arranged at right angles to one another in a shifting device housing.

BACKGROUND OF THE INVENTION

As increased requirements are imposed on shifting devices for automatic transmissions in motor vehicles especially in terms of the comfort of operation, a manual shifting function is also additionally provided to an increasing extent, besides the automatic shifting functions known for a long time, which usually comprise the selection of a reverse gear as well as a plurality of forward selection ranges, within which the different gears of the automatic transmission are independently selected. These manual shifting functions consist of upshifting or downshifting the individual gears of the automatic transmission by means of the selector lever belonging to the shifting device by tipping the selector lever forwards or backwards. A second, separate, so-called tipping gate is usually used for this. The tipping gate and the automatic shift gate are usually located in planes located in parallel next to each other, and the selector lever to be moved in the shift gates is movable about a so-called shift gate axis. In addition, the selector lever is pivotable about a selector lever axis both within the automatic shift gate and within the tipping gate and the shift gate axis and the selector lever axis being arranged at right angles to one another.

The motion of the selector lever is transmitted within the automatic shift gate corresponding to the shifting devices known from the state of the art by means of a connection member at the selector lever or at the selector lever housing, which is connected to a coupling element to the automatic transmission. This coupling element may be, for example, a Bowden cable. The motion of the selector lever in the tipping gate takes place, as a rule, on the basis of the tipping motions of the selector lever, which are necessary only here, by sensor elements electronically to the automatic transmission. During pivoting of the selector lever and of the selector lever housing connected thereto from the automatic shift gate into the tipping gate, which can be carried out usually in position D, i.e., in the forward gear range of the automatic transmission, the connection member is received with the connected coupling element in a corresponding recess of the shifting device housing and is fixed there. Such a design variant is known, for example, from the applicant's DE 196 00 526.

Even though the construction disclosed there has, in principle, proved successful, this leads to the drawback that there always must be some clearance in the area of the carrier between the selector lever and the connection member to the Bowden cable in order not to generate any interfering forces during the shifting into the tipping gate or out of the tipping gate. The clearance present is naturally perceptible at the selector lever and may assume a no longer tolerable extent over the service life of the shifting device.

In addition, design embodiments of shifting devices are known in which the uncoupling of the selector lever from the cable leading to the automatic transmission in the tipping gate is brought about by a pin of the selector lever moving out of the corresponding mounting lug of the cable, while the cable is at the same time fixed in the shifting device housing. The connection between the pivot of the selector lever and the lug of the cable must be provided with sufficient clearance in this case as well in order not to generate any interfering forces during the changeover between the automatic shift gate and the tipping gate and to guarantee, moreover, reliable hanging of the cable.

Moreover, the presence of a plurality of individual parts, which cause rather substantial costs during the manufacture and the mounting of such shifting devices, is disadvantageous in the existing state of the art in the constructions of this class due to the relative complexity of the entire shifting device.

SUMMARY OF THE INVENTION

Therefore, the object of the present invention is to provide a shifting device for an automatic transmission of a motor vehicle, which can be manufactured with the smallest possible number of individual parts in a simple manner and at a low cost and in which reliable, clearance-free uncoupling of the connection member for transmitting the pivoting motion of the selector lever in the automatic shift gate to the automatic transmission in the tipping gate and the recoupling to the automatic transmission in the automatic shift gate are guaranteed.

The shifting device according to the present invention for an automatic transmission of a motor vehicle has a selector lever, which is permanently connected to a selector lever housing and is mounted pivotably about a first shift gate axis in a shifting device housing which is a rigid part of the body, as a result of which the changeover between an automatic shift gate and a tipping gate is made possible. Selector levers with selector lever housing are, moreover, pivotable about a second selector lever axis within the two shift gates, the selector lever axis and the shift gate axis being arranged at right angles to one another in the shifting device housing. A connection member for transmitting the pivoting motion of the selector lever and the selector lever housing while it is positioned in the automatic shift gate to a coupling member to the automatic transmission is present at the selector lever housing, and the connection member is fixed in a recess of the shifting device housing during the pivoting of the selector lever together with the selector lever housing about the shift gate axis into the tipping gate. In the automatic shift gate, the user of the vehicle can pivot the selector lever about the selector lever axis in the manner known per se, so that the individual gears R, D, 4, 3, 2, 1, if present, can be selected by the user of the vehicle.

The variant of the shifting device according to the present invention provides for the connection member for transmitting the pivoting motion of the selector lever in the automatic shift gate to be fixed rotatably in an axis of rotation at a pivot lever, which is mounted rotatably on a holding pin, which is arranged in parallel to the selector lever axis at the selector lever housing, and for the pivot lever to be mounted rotatably in a holding device of the shifting device housing with a pivot pin while the selector lever is positioned in the automatic shift gate.

Due to the fact that a pivotable pivot lever is arranged in the above-described manner between the selector lever and the selector lever housing, it is possible to achieve absence of clearance of the selector lever within the framework of the given kinematic possibilities.

As soon as the selector lever is pivoted from its position in the automatic shift gate into the tipping gate, the connection member with the connected coupling element in the form of, e.g., a cable, is automatically fixed in the corresponding opening of the housing, and the fixation of the pivot pin of the pivot lever in the holding device of the shifting device housing is automatically abolished. The pivot lever can now pivot about the axis of rotation of the connection member fixed in the shifting device housing because of its connection to the selector lever housing, which is embodied by the holding pin. A relative motion develops as a result between the pivot lever and the selector lever housing, which motion can be used, corresponding to an advantageous variant of the subject of the present invention, to provide a restoring force opposing the relative motion of the selector lever in relation to the pivot lever in the tipping gate by a locking system between the selector lever housing and the pivot lever. The locking system may have a connecting link guide and a spring-loaded pressing roller arranged at the selector lever housing at the pivot lever. It is additionally possible at the same time to ensure by this additional measure by means of the locking system in the position of the selector lever within the automatic shift gate that the connection of the selector lever and the pivot lever with the connection member connected thereto to the cable is free from clearance even if the pivot lever mounted in the holding device of the shifting device housing by means of the pivot pin is not mounted there completely without clearance.

Another advantageous embodiment of the subject of the present invention provides, moreover, for the center lines of the axis of rotation of the connection member, of the holding pin and of the pivot pin of the pivot lever to be arranged in parallel to one another in a common plane of the pivot lever. Moreover, the central axis of the pivot pin, of the pivot lever and of the selector lever axis may be arranged on a common line in the middle position of the selector lever in the tipping gate. The embodiments described ensure a balanced kinematics of the parts of the shifting device that are mobile in relation to one another.

Furthermore, it is advantageous if locking means are provided at the selector lever for fixation in the two particular shift gates.

An exemplary embodiment of the subject of the present invention will be explained in more detail below on the basis of the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
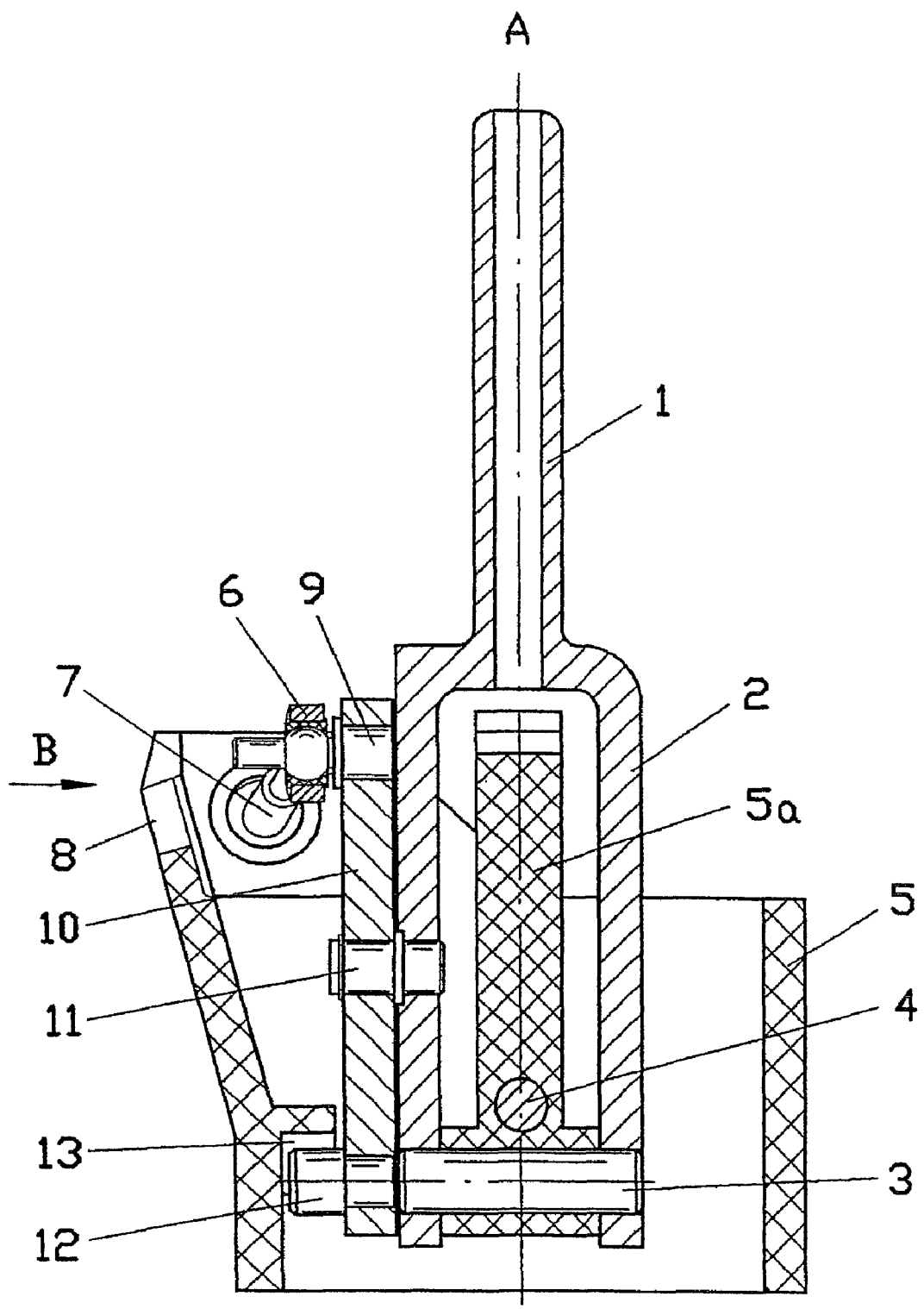
FIG. 1 is a sectional view through a shifting device according to the present invention with the selector lever being positioned in the automatic shift gate.

Referring to the drawings in particular, The shifting device shown in FIG. 1 for an automatic transmission represents an inexpensive variant which can be manufactured in an especially simple manner, in which a possible clearance of the selector lever 1 with the connected selector lever housing 2 in the two existing shift gates of the automatic shift gate A and the tipping gate S is at the same time avoided. According to the present exemplary embodiment, the selector lever 1 and the selector lever housing 2 are mounted in a shifting device housing 5. There are two mounting sites in the shifting device housing 5, one mounting site being used, on a selector lever carrier 5a belonging to the shifting device housing 5, as a mount for a selector lever axis 3, about which the selector lever is pivotable in both the automatic shift gate A and in the tipping gate S. At the same time, a shift gate axis 4 is arranged in the shifting device housing 5 at right angles to the selector lever axis 3 above the latter axis. The selector lever 1, the selector lever housing 2 as well as the selector lever carrier 5a are likewise pivotable about this shift gate axis 4 and it can be transferred from the position of the selector lever shown in FIG. 1 into a tipping gate S according to FIG. 2, which is pivoted to the left in the drawing.

To transmit the pivoting motion of the selector lever 1 about the selector lever axis 3 in the automatic shift gate A to an automatic transmission arranged in the motor vehicle, a connection member 6, which acts to as a coupling member 7 for connection with the automatic transmission in the form of a cable with a cable lug located at the end, is located within the shifting device.

Corresponding to the design of the shifting device according to the present invention, the connection member 6 is rotatably fixed at a pivot lever 10 by means of an axis of rotation 9. The pivot lever 10 has, above the axis of rotation 9 and facing away from the selector lever 1, another axis of rotation in the form of a holding pin 11. The holding pin 11 is received in a hole of the pivot lever 10 and represents a hinge connection to the selector lever housing 2.

Moreover, a pin 12, which is likewise received in a hole of the pivot lever 10 and, as is apparent from the view in FIG. 1, is received in a holding device 13 of the shifting device housing 5 while the selector lever 1 with the connected selector lever housing 2 is positioned in the automatic shift gate A, is located at the pivot lever 10 in the lowermost area.

Figure 2:
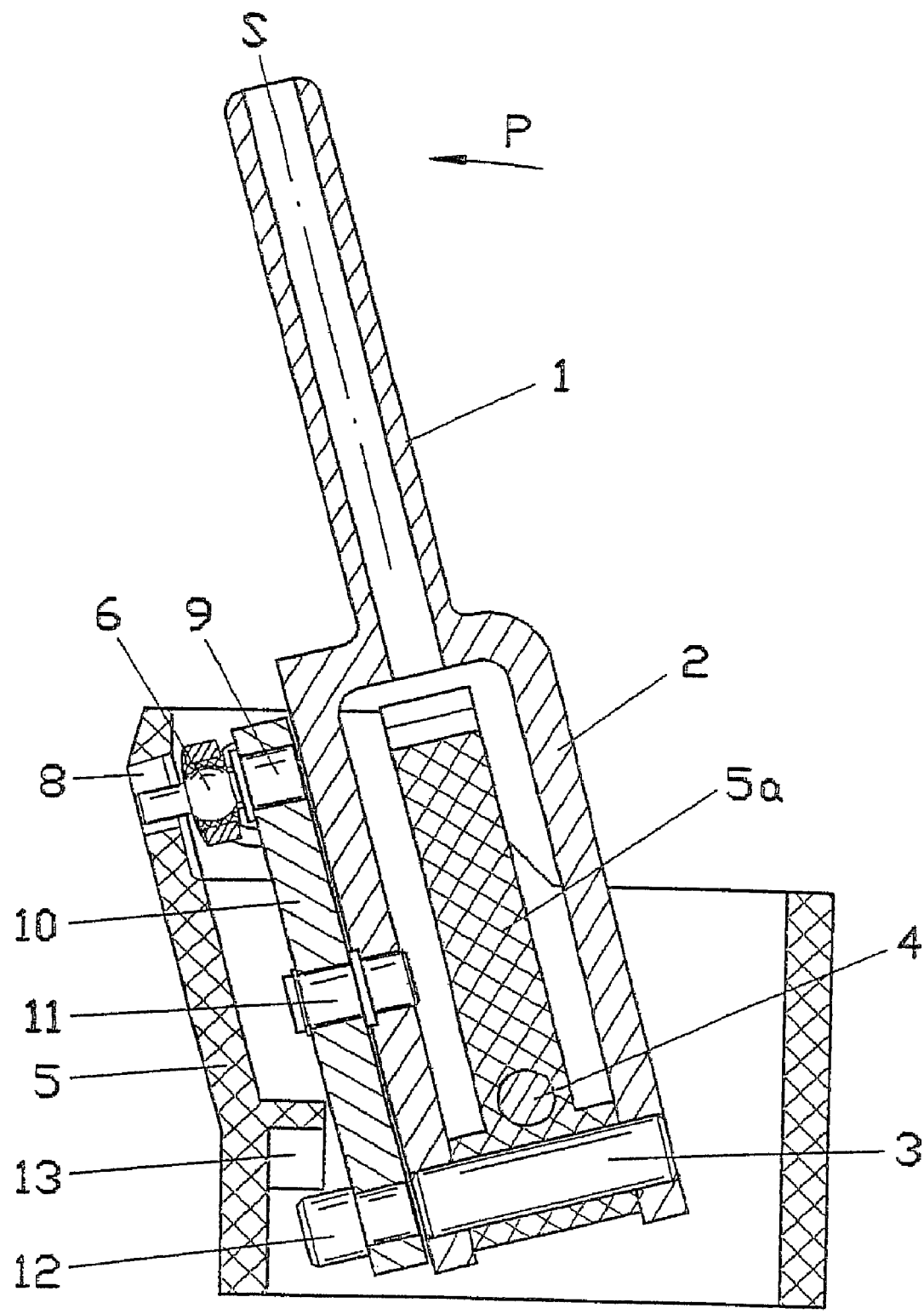
FIG. 2 is a sectional view through the shifting device from FIG. 1 according to the present invention with the selector lever positioned in the tipping gate.
Figure 3:
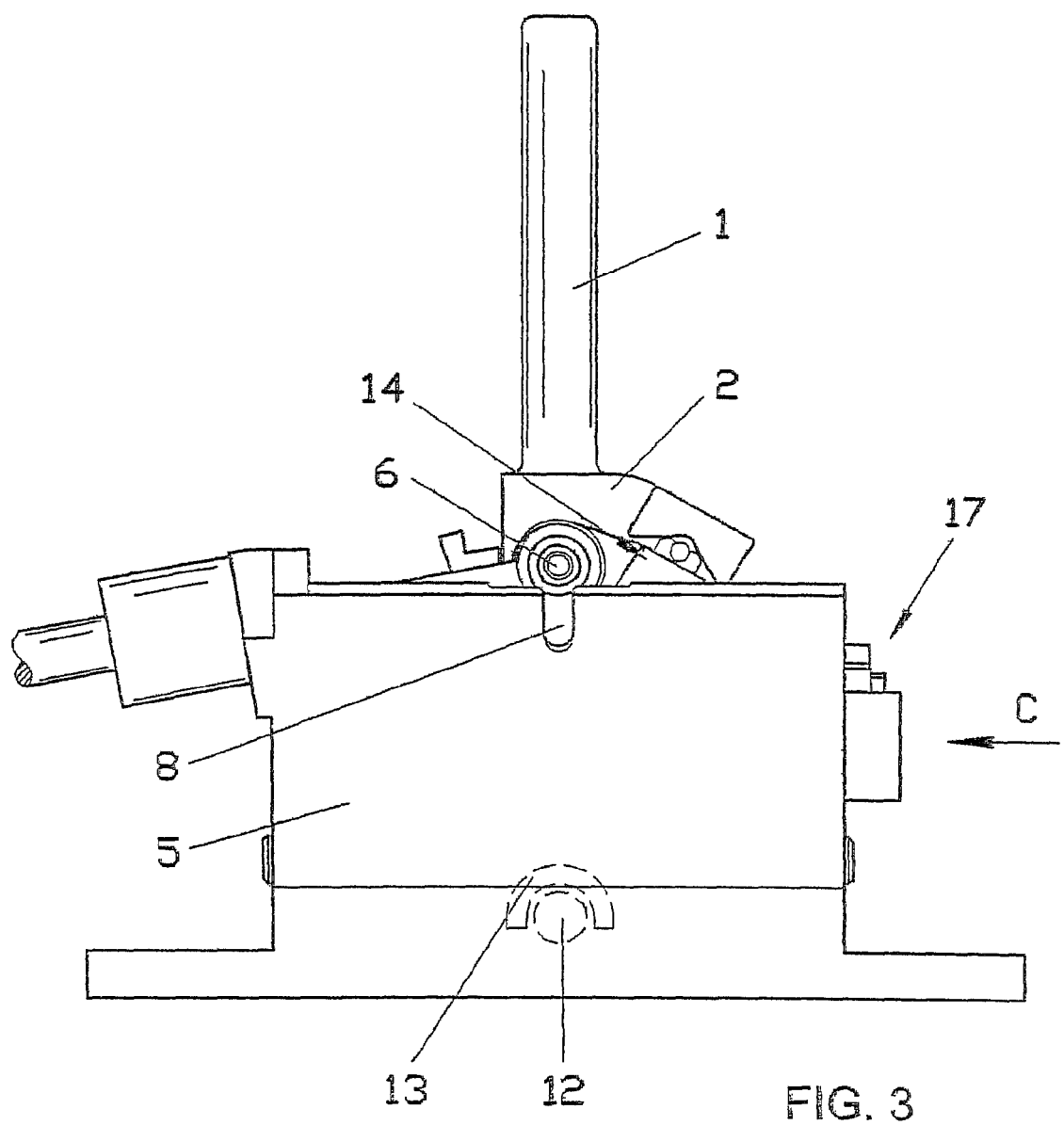
FIG. 3 is a side view of the shifting device corresponding to arrow B in FIG. 1.
Figure 6:
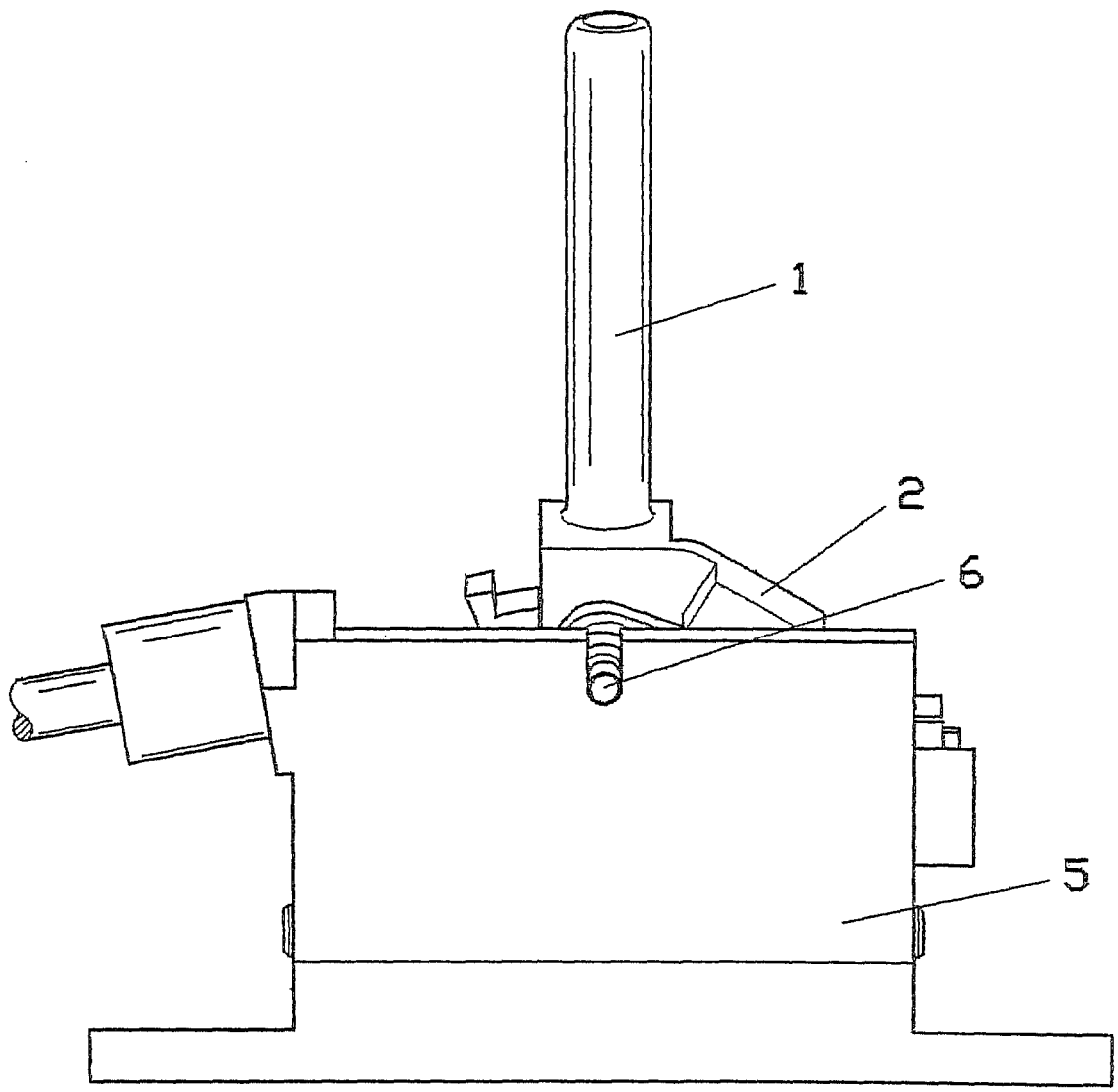
FIG. 6 is a side view of the shifting device according to the present invention with the selector lever positioned in the tipping gate corresponding to the sectional view in FIG. 2.

As is shown in FIG. 3, the holding device 13 comprises essentially a semicircular projection, which projects towards the inner side of the shifting device housing and prevents the lateral displacement of the pin 12 in the shown position of the selector lever 1 in the automatic shift gate A corresponding to FIG. 1. The pin 12 can be pivoted out of the holding device 13 thus designed by moving the selector lever 10 out of the automatic shift gate position A into the tipping gate position S as this is shown in FIG. 2. Besides the pivoting of the selector lever 1 in the direction of arrow P in FIG. 2, a projection of the connection member 6 is at the same time introduced into a recess 8 of the shifting device housing 5. The recess 8 comprises, as is shown in FIGS. 3 and 6, an essentially U-shaped slot open towards the top side of the shifting device housing 5. The recess 8 receives the projection of the connection member 6 in the tipping gate position of the selector lever 1 and thus fixes at the same time the coupling element 7 connected to the connection member 6 in the position preselected beforehand by the selector lever 1 in the automatic shift gate A. This position is usually position D of the automatic transmission, in which automatic gear selection of all gears is carried out by the control of the automatic transmission.

Figure 4:
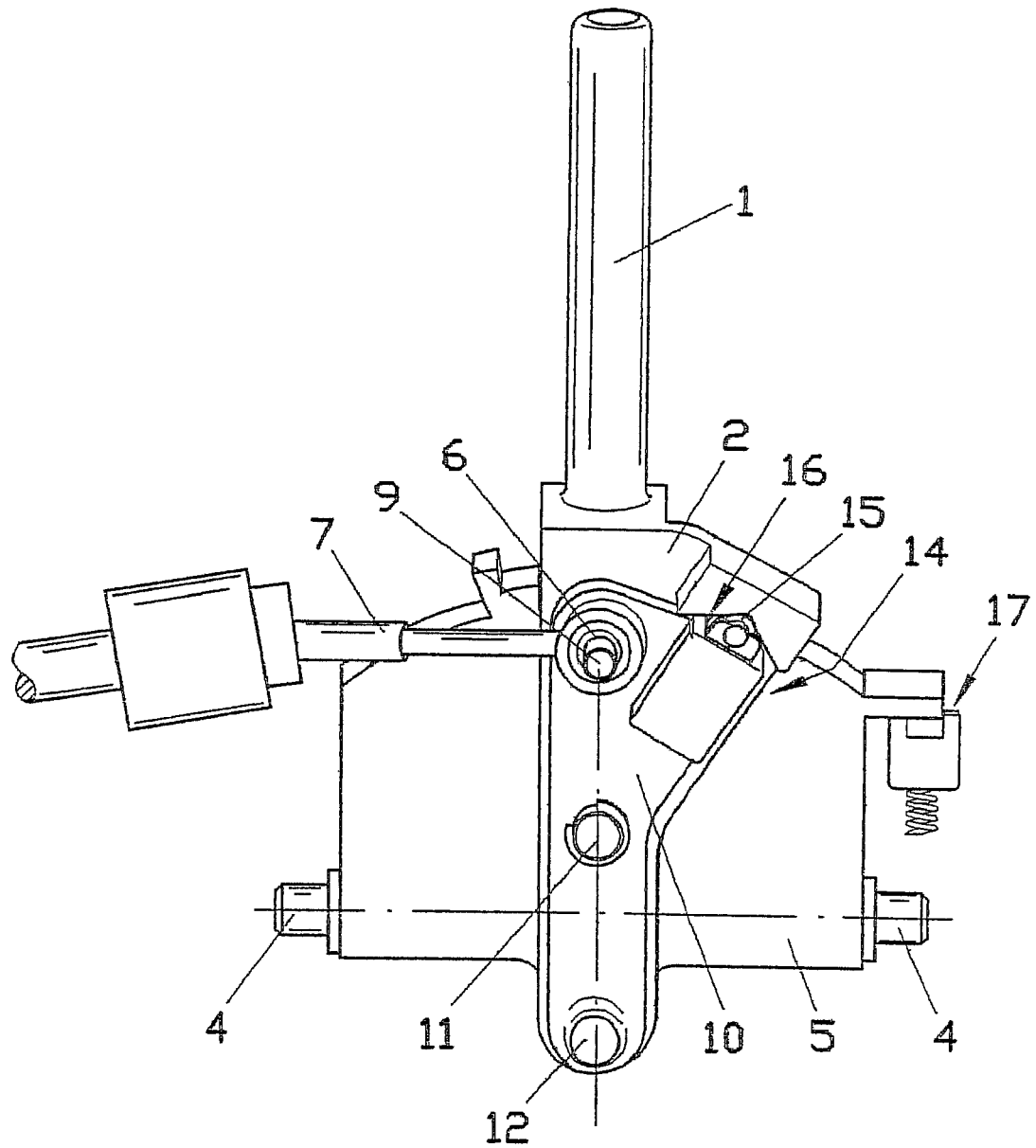
FIG. 4 is a side view of the shifting device corresponding to FIG. 3 with the shifting device housing removed.

Position D of the selector lever 1 in the automatic shift gate is once again shown in FIG. 4 with the shifting device housing 5 removed. It should be borne in mind that the pin 12 of the pivot lever 10 is received stationarily in the shifting device housing 5. The central axis of the pin 12 is arranged here flush with the center line of the selector lever axis 3 of the selector lever 1.

Figure 5:
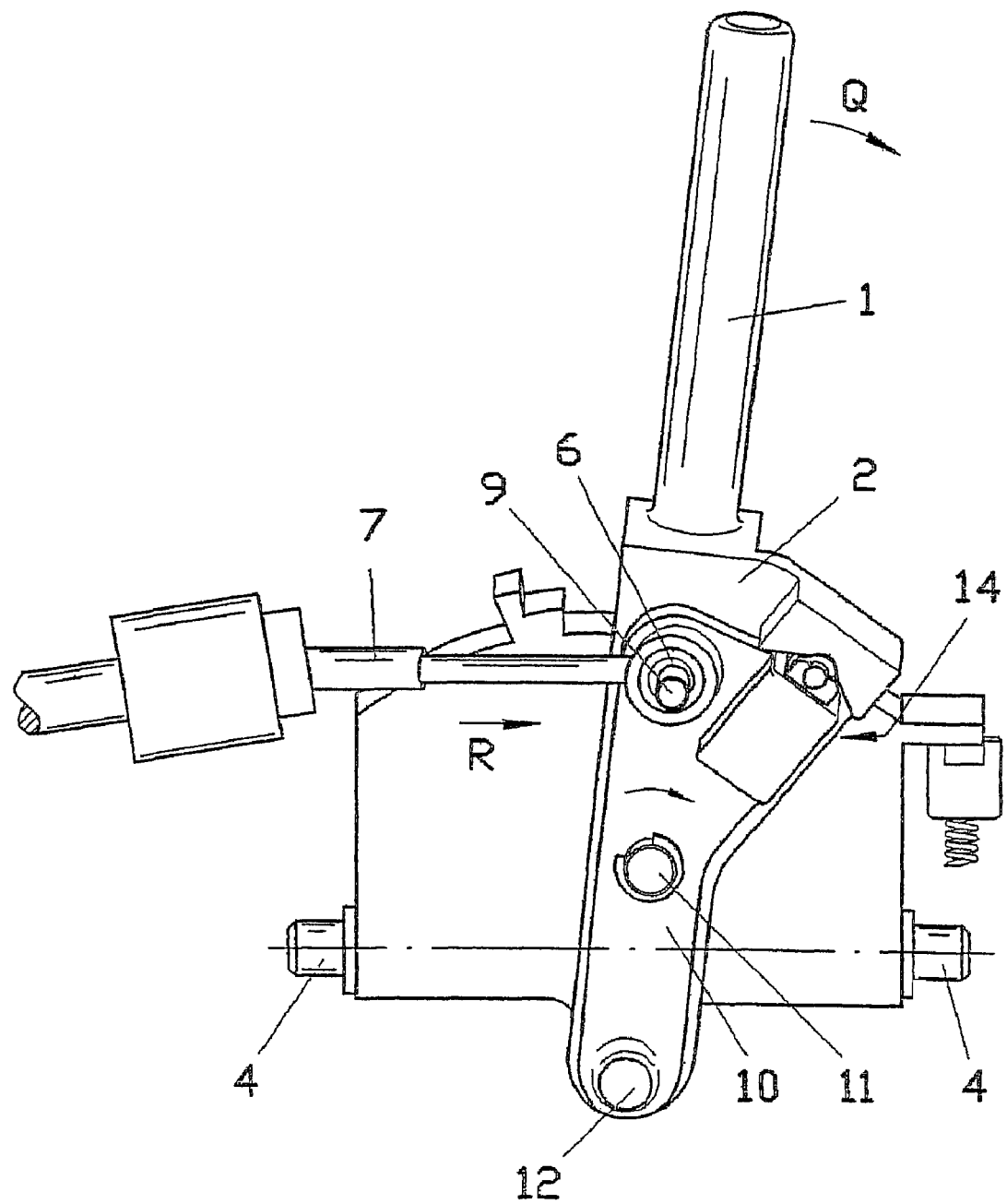
FIG. 5 is a view of the shifting device corresponding to FIG. 4 when the selector lever is deflected from the D position shown in FIG. 4.

Based on these kinematic conditions, FIG. 5 shows a pivoting of the selector lever 1 within the automatic shift gate A from position D to the right in the direction of arrow Q in FIG. 5. Due to the connection of the selector lever housing 2 to the pivot lever 10 via the holding pin 11 arranged above the pin 12, the pivot lever 10 is deflected synchronously with the selector lever housing 2, as a result of which the connection member 6 located at the pivot lever 10 is displaced at the same time, which leads to a motion of the coupling element 7 and the cable, respectively, in the direction of arrow R in FIG. 5.

In addition, it can be determined from both FIG. 4 and FIG. 5 that a locking system 14 is arranged between the selector lever housing 2 and the pivot lever 10. The locking system 14 comprises essentially a connecting link guide 16, which is arranged at the selector lever housing 2 and has a V-shaped design. Furthermore, a housing with a spring-loaded pressing roller 15 projecting from the housing is located at the pivot lever 10, opposite to the connecting link guide 16. The spring loading is provided by a compression spring, which is located in the housing of the locking system 14 and is not shown in more detail here. In the views in FIGS. 4 and 5, the pressing roller 15 is located within the V-shaped connecting link guide 16 at the lowest position thereof and defines the positions of the pivot lever 10 and the selector lever housing 2 in relation to one another, which positions are shown in FIGS. 4 and 5. A clearance that may be present between the pivot lever 10 and the selector lever 1 is eliminated by the locking system 14, so that handling of the selector lever 1 with good grip is guaranteed.

If the selector lever 1 with the selector lever housing 2 connected thereto has been pivoted corresponding to FIG. 6 into the tipping gate S (according to FIG. 2) from the automatic shift gate A (corresponding to FIG. 1), the connection member 6 is located, as was already shown in detail above, within the recess 8 of the shifting device housing 5. At the same time, the lower pin 12 of the pivot lever 10 is moved out of the holding device 13 and is therefore mobile. The pivot lever 10 can thus pivot now about the axis of rotation of the upper connection member 6 in the tipping gate position shown in FIG. 6.

Figure 7:
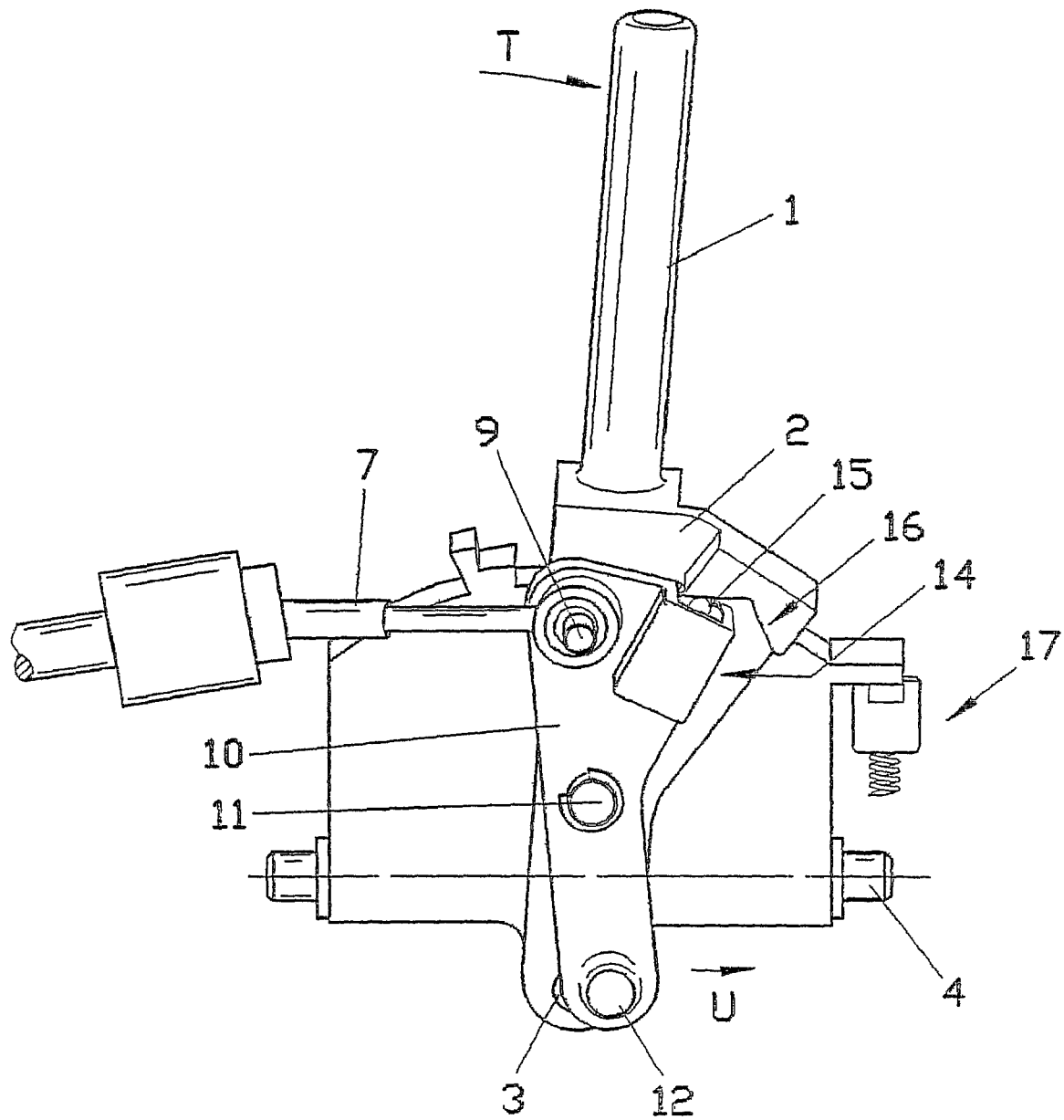
FIG. 7 is a side view of the shifting device with the selector lever positioned in the tipping gate corresponding to FIG. 6 with the shifting device housing removed.

Such a motion is brought about by a motion corresponding to arrow T of the selector lever 1 in FIG. 7. This figure shows one of the so-called tipping positions of the selector lever 1 within the tipping gate S. From a kinematic point of view, the selector lever 1 with the selector lever housing 2 connected thereto pivots within the shifting device housing about the selector lever axis 3. Since the pivot lever is fixed at the same time at the upper fulcrum point of the connection member 6 and there is, moreover, a connection between the selector lever housing 2 and the pivot lever 10 in the area of the holding pin 11, motion of the selector lever 1 in the direction of arrow T leads at the same time to deflection in the direction of arrow U of the pivot lever in its lower area, in which the pin 12 is located.

As can be determined, moreover, from FIG. 7, the pressing roller 15 within the connecting link guide 16 at the same time rolls up on one of the flanks of the connecting link guide out of its lowermost inoperative area within the locking system 14. A righting moment is provided by the spring-loaded pressing roller 15, and this righting moment causes the selector lever 1 to return into its middle position, in which the pressing roller 15 is at the lowest point of the connecting link guide 16, after a deflection in the direction shown as well as after its subsequent release by the user of the vehicle.

Figure 8:
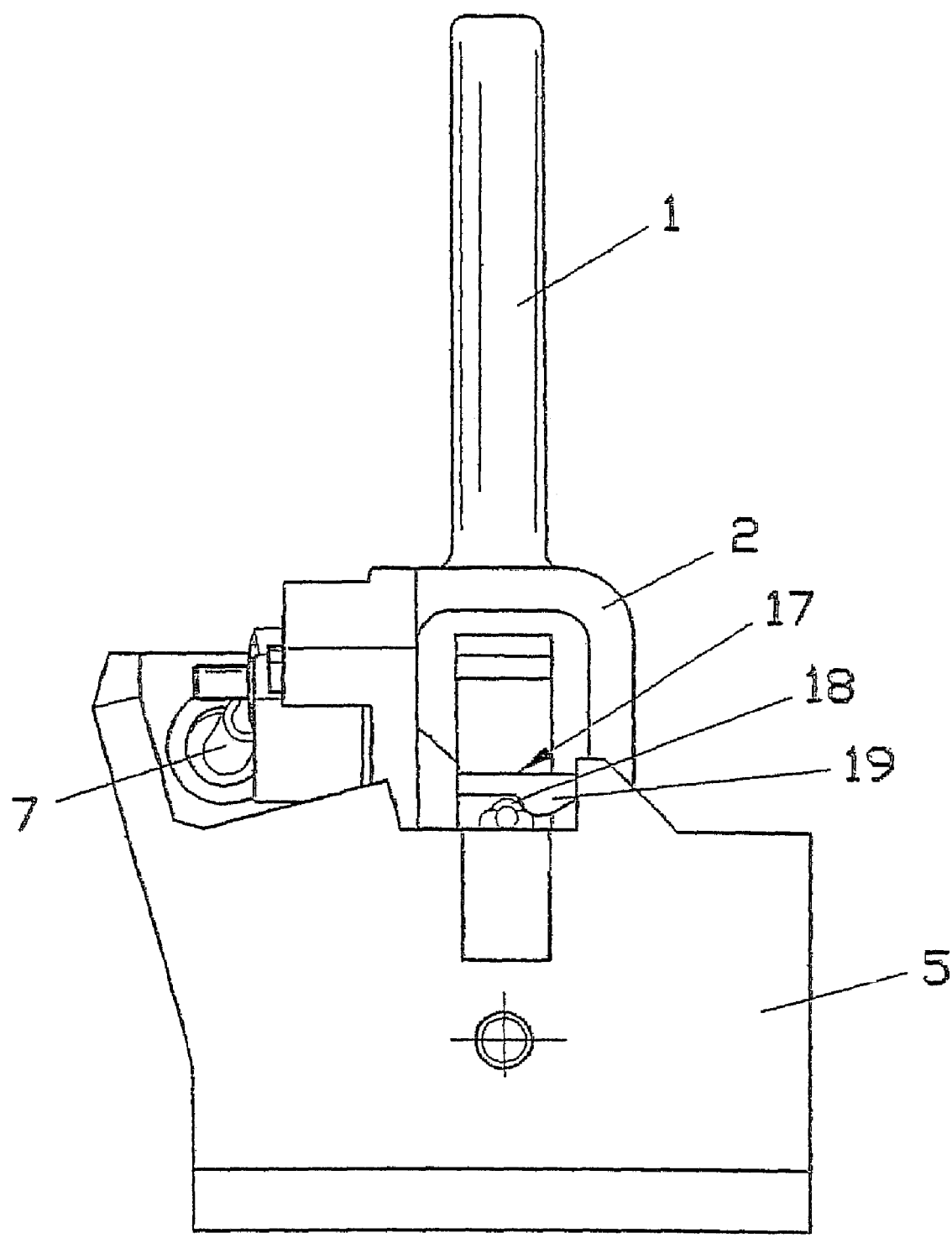
FIG. 8 is a front view of the shifting device with the selector lever positioned in the automatic shift gate corresponding to arrow C in FIG. 3.
Figure 9:
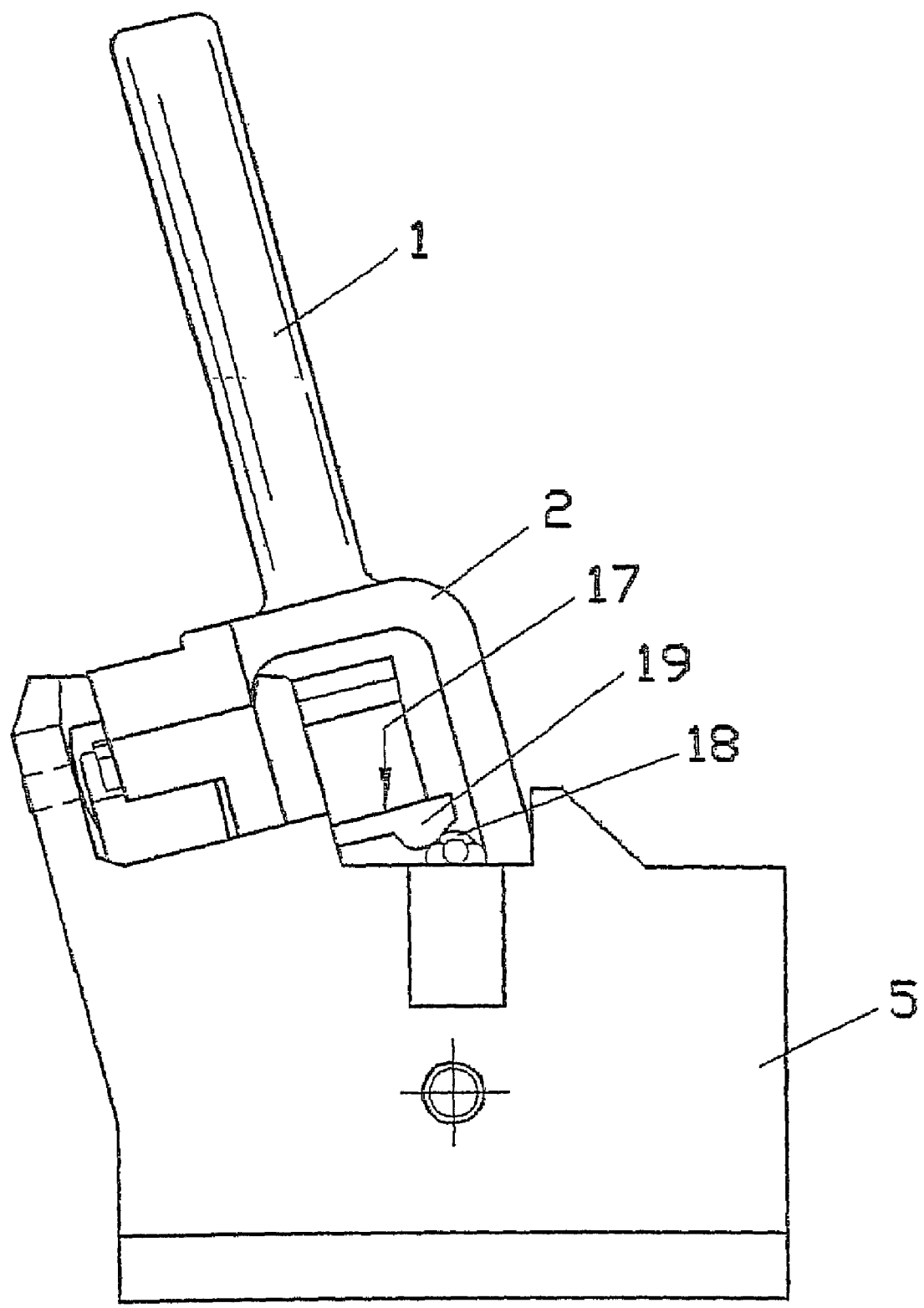
FIG. 9 is a front view of the shifting device corresponding to FIG. 8 with the selector lever positioned in the tipping gate.

FIGS. 8 and 9 additionally explain a locking means 17, which fixes the selector lever 1 with the selector lever housing 2 either in the automatic shift gate position A corresponding to FIG. 8 or in the tipping gate position S corresponding to FIG. 9.

The locking means 17 comprises essentially, analogously to the explanations given above in connection with the locking system 14, a spring-loaded pressing roller 18 as well as a holding pin 19 located opposite the pressing roller 18 at the selector lever housing 2. If the selector lever housing 2 is moved from the automatic shift gate position into the tipping gate position, the holding pin 19 pushes the spring-loaded pressing roller 18 in the direction of the bottom of the shifting device housing, so that pivoting of the selector lever housing 2 can take place. If the selector lever housing 2 has been transferred into the tipping gate position, the pressing roller 18, which is again moving upwards, fixes the selector lever 1 in this position, as this is shown in FIG. 9, because the pressing roller 18 now pushes against the other flank of the holding pin 19.

While specific embodiments of the invention have been shown and described in detail to illustrate the application of the principles of the invention, it will be understood that the invention may be embodied otherwise without departing from such principles.

The invention claimed is:

1. A shifting device for an automatic transmission of a motor vehicle, the shifting device comprising:
    shifting device housing having a holding device;
    a first automatic shift gate;
    a tipping gate for a manual, stepwise shifting operation about a middle position;

a selector lever with a selector lever housing, said selector lever being pivotable about a shift gate axis into the automatic shift gate and into said tipping gate and about a selector lever axis within the shift gates, wherein the selector lever axis and the shift gate axis are arranged at right angles to one another in said shifting device housing;

a connection member for transmitting the pivoting motion of the selector lever in the automatic shift gate to a coupling element to the automatic transmission, said connection member being fixed in a recess of the shifting device housing when the selector lever is pivoted about the shift gate axis into the tipping gate;

a holding pin arranged in parallel to said selector lever axis at said selector lever housing;

a pivot lever received rotatably on said holding pin and having a pivot pin, said connection member being fixed rotatably with a connection member axis of rotation at said pivot lever, said pivot lever being positioned with said pivot pin in said holding device while said selector lever is positioned in said automatic shift gate, and said pivot pin disengaging said holding device when said selector lever is positioned in said tipping gate.

2. A shifting device in accordance with claim 1, wherein said connection member axis of rotation and an axis of rotation of said holding pin and axis of rotation of said pivot pin of said pivot lever are arranged in parallel to one another in a common plane.

3. A shifting device in accordance with claim 1, wherein a central axis of said holding pin of said pivot lever and a central axis of said selector lever axis are arranged on a common line in a middle position of said selector lever in said tipping gate.

4. A shifting device in accordance with claim 1, further comprising a locking system between said selector lever housing and said pivot lever, wherein in said tipping gate said locking system provides a restoring force opposing the stepwise relative motion of said selector lever in relation to said pivot lever.

5. A shifting device in accordance with claim 4, wherein said locking system has a spring-loaded pressing roller arranged in a connecting link guide at said selector lever housing.

6. A shifting device in accordance with claim 5, wherein said connecting link guide has an essentially V-shaped rolling surface for the motion of said pressing roller.

7. A shifting device in accordance with claim 1, wherein said holding pin of said pivot lever at said selector lever housing is arranged at equal distance between said connection member axis of rotation at said pivot lever and said pivot pin.

8. A shifting device in accordance with claim 1, further comprising a shift gate locking means for fixation of said shift lever in a particular shift gate, said shift gate locking means being provided at said selector lever.

9. A shifting device in accordance with claim 1, wherein said holding pin is made in one piece with said selector lever.

10. A shifting device in accordance with claim 1, wherein said pivot pin is made in one piece with said pivot lever.

11. A motor vehicle automatic transmission shifting device comprising:

shifting device housing having a holding device;

a selector lever mounted relative to said shifting device housing to pivot about a shift gate axis into an automatic shift gate and into a tipping gate and about a selector lever axis within the automatic shift gate and within the tipping gate, wherein the selector lever axis and the shift gate axis are arranged at right angles to one another;

a coupling element connected to an automatic transmission;

a connection member for transmitting the pivoting motion of the selector lever in the automatic shift gate to said coupling element, said connection member being fixed in a recess of the shifting device housing when the selector lever is pivoted about the shift gate axis into the tipping gate;

a holding pin connected to said selector lever and arranged in parallel to said selector lever axis;

a pivot lever received rotatably on said holding pin and having a pivot pin, said connection member being fixed rotatably at said pivot lever and having with a connection member axis of rotation, said pivot lever being positioned with said pivot pin in said holding device while said selector lever is positioned in said automatic shift gate, and said pivot pin disengaging said holding device when said selector lever is positioned in said tipping gate.

12. A shifting device in accordance with claim 11, wherein said connection member axis of rotation and an axis of rotation of said holding pin and axis of rotation of said pivot pin of said pivot lever are arranged in parallel to one another in a common plane.

13. A shifting device in accordance with claim 11, wherein a central axis of said holding pin of said pivot lever and a central axis of said selector lever axis are arranged on a common line in a middle position of said selector lever in said tipping gate.

14. A shifting device in accordance with claim 11, further comprising a locking system, wherein said selector lever includes a selector lever housing and said locking system is between said selector lever housing and said pivot lever, wherein in said tipping gate said locking system provides a restoring force opposing the stepwise relative motion of said selector lever in relation to said pivot lever.

15. A shifting device in accordance with claim 14, wherein said locking system has a spring-loaded pressing roller arranged in a connecting link guide at said selector lever housing.

16. A shifting device in accordance with claim 15, wherein said connecting link guide has an essentially V-shaped rolling surface for the motion of said pressing roller.

17. A shifting device in accordance with claim 11, wherein said selector lever includes a selector lever housing and said holding pin of said pivot lever at said selector lever housing is arranged at equal distance between said connection member axis of rotation at said pivot lever and said pivot pin.

18. A shifting device in accordance with claim 11, further comprising a shift gate locking means for fixation of said shift lever in a particular shift gate, said shift gate locking means being provided at said selector lever.

19. A shifting device in accordance with claim 11, wherein said holding pin is made in one piece with said selector lever.

20. A shifting device in accordance with claim 11, wherein said pivot pin is made in one piece with said pivot lever.

* * * * *